(12) United States Patent
Remaker et al.

(10) Patent No.: US 7,743,174 B2
(45) Date of Patent: Jun. 22, 2010

(54) DUAL UTILIZATION OF A PHYSICAL PORT OF AN ELECTRONIC DEVICE

(75) Inventors: Phillip Remaker, San Jose, CA (US); Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 11/966,067

(22) Filed: Dec. 28, 2007

(65) Prior Publication Data

US 2009/0172207 A1 Jul. 2, 2009

(51) Int. Cl.
*G06F 3/00* (2006.01)
(52) U.S. Cl. .................. 710/11; 710/8; 710/14
(58) Field of Classification Search .................. 370/246, 370/252–253; 710/1, 2, 8, 11, 14, 15–19
See application file for complete search history.

(56) References Cited

U.S. PATENT DOCUMENTS

| | | | |
|---|---|---|---|
| 6,104,803 A | | 8/2000 | Weser et al. |
| 6,535,983 B1 | * | 3/2003 | McCormack et al. ....... 713/310 |
| 6,839,343 B2 | | 1/2005 | Kelliher et al. |
| 7,092,375 B2 | | 8/2006 | Pitsoulakis |
| 7,353,260 B1 | | 4/2008 | Senum |
| 7,533,194 B2 | * | 5/2009 | Koertel .......................... 710/8 |

* cited by examiner

*Primary Examiner*—Niketa I Patel
*Assistant Examiner*—Richard Franklin
(74) *Attorney, Agent, or Firm*—BainwoodHuang

(57) ABSTRACT

An electronic device has a physical port, and a control circuit coupled to the physical port. The control circuit is arranged to electrically sense the physical port, and operate the physical port as one of an Ethernet port and an RS-232 port based on electrically sensing the physical port. In some arrangements, the physical port operates as an Ethernet port at one time and an RS-232 port at another time. In some arrangements, the electronic device senses for Ethernet signals and RS-232 signals concurrently. In other arrangements, the electronic device senses for Ethernet signals and RS-232 signals at different times in an alternating manner.

20 Claims, 6 Drawing Sheets

DUAL UTILIZATION OF A PHYSICAL PORT OF AN ELECTRONIC DEVICE

BACKGROUND

A conventional router typically includes a set of Ethernet ports and a serial console port. Each Ethernet port typically includes an RJ-45 style female jack to receive a connecting end of an Ethernet cable (e.g., a Cat-3, Cat-5, Cat-5e or better). The serial console port typically includes a DB-9 or DB-25 connector or an RJ-45 jack to receive a connecting end of an RS-232 cable.

During operation, the conventional router sends and receives Ethernet communications signals through its Ethernet ports. Each Ethernet communications signal is a differential signal having a positive (+) signal component and a negative (−) signal component which is opposite the positive signal component and isolated from ground. Some router devices operate as PSE (power sourcing equipment) to provide power concurrently with communications signals through the Ethernet ports to PDs (powered devices) in accordance with established Power over Ethernet (PoE) standards.

In contrast to the above-described Ethernet ports which carry Ethernet communications signals and possibly power, the serial console port provides an administrative interface for a local "dumb" terminal. That is, the serial console port is a serial communication physical interface through which a user is able to carry out a number of local administrative functions that could not or should not be conducted over an Ethernet connection. For instance, the operating system of the router may treat a user login session through the local terminal, which is connected to the serial console port, as more trustworthy/secure.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
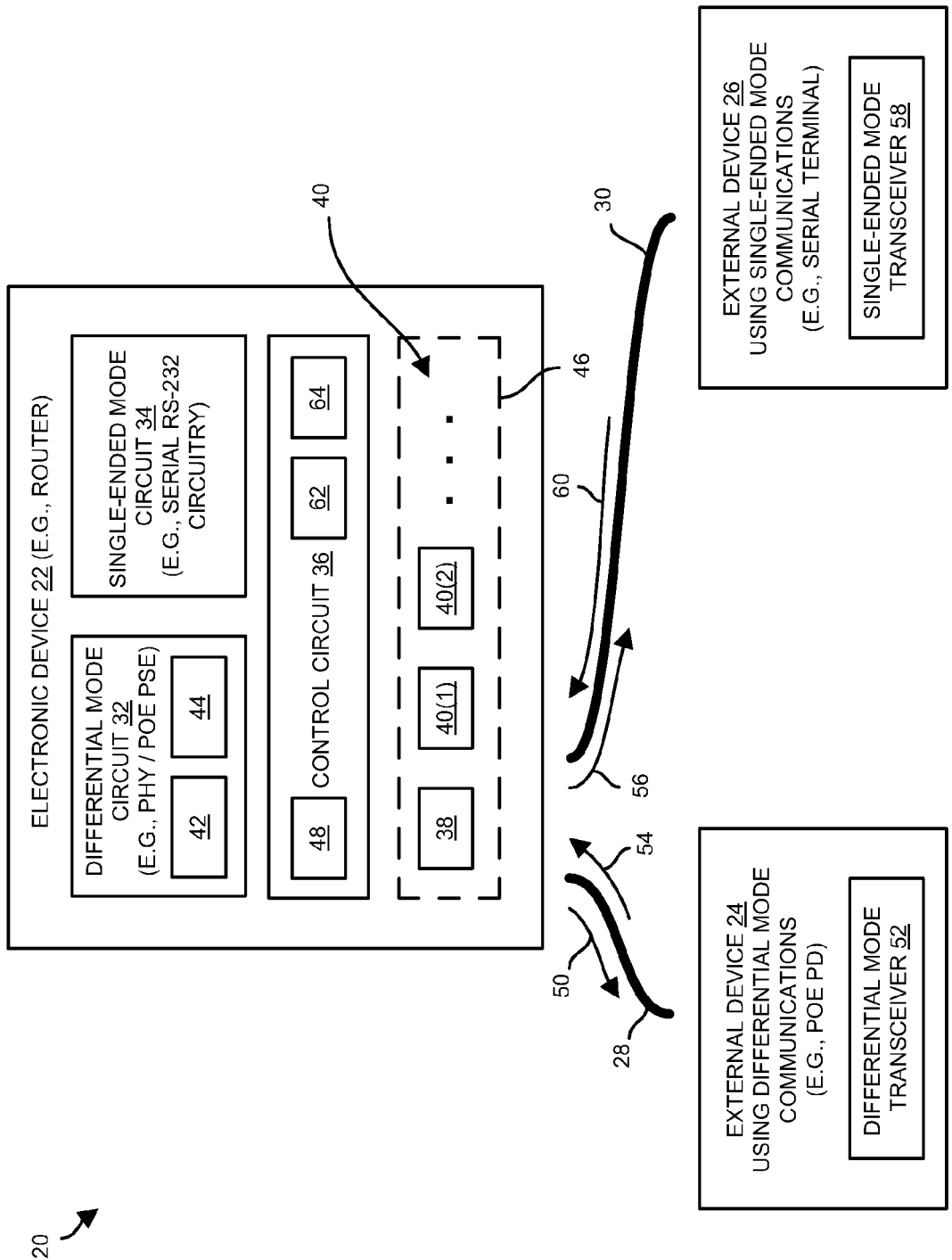
FIG. 1 is a diagram of an electronic system which is capable of handling communications using differential mode signaling and single-ended mode signaling through a same physical port.

Unfortunately, there are deficiencies to the above-described conventional router. For example, the above-described conventional router does not make very efficient use of available connecting space or connecting "real estate". That is, the conventional router device allocates space to accommodate the serial console port even though the serial console port typically is rarely used. Such space could be much better spent on another Ethernet port to increase the device's connection density or could be given back (i.e., saved) to reduce the device's form factor.

Furthermore, there are certain costs associated with manufacturing, testing and supporting a conventional router device with a dedicated serial console port (e.g., the cost of the serial console port connector, the cost of assembly, etc.). If the serial console port were eliminated, these associated costs (e.g., the assembly cost of a full-time serial console port) could be invested elsewhere in the router or simply saved.

It should be understood that, although a physical RJ-45 female jack can carry Ethernet or RS-232 signals, Ethernet and RS-232 signals cannot be carried simultaneously. The signaling schemes are dramatically differs, so there is no simple conventional way to accommodate switching between the two modes. Nevertheless, the ability to use a single RJ-45 female jack which can dynamically switch between an Ethernet and RS-232 mode of operation would be useful.

In contrast to the above-described conventional router which has a dedicated serial console port, an improved electronic device utilizes a physical port which is capable of serving double duty as either (i) a differential mode signal port or (ii) a single-ended mode signal port. For example, such a device is capable of operating the physical port as a standard Ethernet port during normal operating conditions. However, if there is a need to connect a local device (e.g., a local "dumb" terminal) to the electronic device for a period of time (e.g., for trustworthy/secure system administration), the local device can connect to the same physical port which then serves as the serial console port for that period of time.

Along these lines, an embodiment is directed to an electronic device having a physical port, and a control circuit coupled to the physical port. The control circuit is arranged to electrically sense the physical port, and operate the physical port as one of an Ethernet port and an RS-232 port based on electrically sensing the physical port.

Another embodiment is directed to a technique for communicating through a physical port of an electronic device. The technique involves providing a differential mode circuit and a single-ended mode circuit in the electronic device. The technique further involves exchanging differential mode 10/100/1000 Base-T Ethernet signals between the differential mode circuit and an external differential mode transceiver through the physical port during a first time period. The technique further involves exchanging single-ended mode signals between the single-ended mode circuit and an external single-ended mode transceiver through the physical port during a second time period which is different than the first time period. In some arrangements, the physical port operates as an Ethernet port at one time and an RS-232 port at another time.

Description of Example Embodiments

FIG. 1 shows an electronic system 20 having an electronic device 22, an external device 24 and another external device 26. The electronic device 22 is capable of connecting with and carrying out differential mode (e.g., Ethernet) communications with the external device 24 through a cable 28. Furthermore, the electronic device 22 is capable of connecting with and carrying out single-ended mode (e.g., RS-232) communications with the other external device 26 through another cable 30.

It should be understood that the term "single-ended mode", in this document, refers to the technique of delivering information through a single wire (e.g., one wire out of a two-wire differential pair as defined by Ethernet) with the reference voltage being ground. In contrast, "differential mode", in this document, uses one of the two-wires of a differential pair to carry the positive signal component of a differential signal and the other of the two-wires of the differential pair to carry the negative signal component of the differential signal (the receiving circuit derives the data based on the difference between the two signal components).

As shown in FIG. 1, the electronic device 22 includes a differential mode circuit 32, a single-ended mode circuit 34, a control circuit 36, a double-duty physical port 38, and a set of standard physical ports 40(1), 40(2), . . . (collectively, ports 40). The differential mode circuit 32 includes a differential mode transceiver 42 and a power source 44.

As further shown in FIG. 1, the double-duty physical port 38 and the ports 40 are arranged as a high density array 46 for organizational purposes and for convenience to the user. In some arrangements, the ports 38, 40 form a single row with the double-duty physical port 38 at one end of the row, e.g., a single row of 8P8C female jacks. In other arrangements, the ports 38, 40 form a two-dimensional layout (e.g., multiple rows and columns of 8P8C female jacks with the double-duty physical port 38 residing in one corner).

During operation of the electronic device 22, the differential mode circuit 32 is capable of exchanging differential mode signals with various external devices through the ports 40. Each differential mode signal has a positive signal component (+) and a negative signal component (−) which is opposite the positive signal component.

Additionally, during operation, the control circuit 36 controls the use of the double-duty physical port 38. In particular, the control circuit 36 controls whether the physical port 38 operates as a differential mode signaling port or a single-ended mode signaling port.

For example, suppose that the user wishes to use the physical port 38 as a differential mode signaling port. To this end, the user connects the electronic device 22 to the external device 24 through the cable 28. The user then actuates a mechanical switch 48 of the control circuit 36 (e.g., by pressing a button or toggling a switch) to direct the differential mode circuit 32 to operate the double-duty physical port 38 as a differential mode signaling port. In response, the differential mode transceiver 42 of the differential mode circuit 32 is arranged to transmit a differential mode transmit signal 50 to a differential mode transceiver 52 of the external device 24 through the physical port 38, and receive a differential mode receive signal 54 from the differential mode transceiver 52 through the physical port 38. Furthermore, if the external device 24 is configured as a PD (e.g., determined by the differential mode circuit 32 via an auto-discovery procedure), the power source 44 is arranged to deliver inline power to the external device 24 through the physical port 38 as well.

Now, at a different time, suppose that the user wishes to use the physical port 38 as a single-ended mode signaling port. To this end, the user connects the electronic device 22 to the external device 26 through the cable 30. The user then actuates the mechanical switch 48 of the control circuit 36 to direct the single-ended mode circuit 34 to operate the physical port 38 as a single-ended mode port. In this situation, the single-ended mode circuit 34 is arranged to transmit a single-ended mode transmit signal 56 to a single-ended mode transceiver 58 of the external device 26 through the physical port 38, and receive a single-ended mode receive signal 60 from the single-ended mode transceiver 58 through the physical port 38 (i.e., single-ended referring to delivery of data through a single wire, the reference being ground).

As an alternative to the mechanical switch 48, the control circuit 36 is capable of running a user application which provides a user interface 62. In this situation, the user is able to logically direct (i) the differential mode circuit 32 to use the physical port 38 as a differential mode signaling port, or (ii) the single-ended mode circuit 34 to use the physical port as a single-ended mode signaling port, e.g., by entering a command into the user interface 62.

As yet another alternative, the control circuit 36 is capable of running automatic discovery circuitry 64 (implemented in either hardware, software, with coordination of the differential mode circuit and/or the single-ended mode circuit 34, combinations thereof, etc.) which conducts periodic sensing through the physical port 38. In particular, the control circuit 36 temporarily shuts down one of the circuits 32, 34 and activates the other of the circuits 32, 34 to determine whether either circuit 32, 34 should remain active for an extended period of time.

In particular, the automatic discovery circuitry 64 shuts down the single-ended mode circuit 34 and activates the differential mode circuit 32 to sense whether the physical port 38 is connected to the external device 24 having the differential mode transceiver 52. If there is a differential mode receive signal 54 on the physical port 38, the control circuit 36 keeps the differential mode circuit 32 active for a predetermined extended period of time. If not or after the period of time has elapsed, the automatic discovery circuitry 64 shuts down the differential mode circuit 32 and activates the single-ended mode circuit 34 to sense whether the physical port 38 is connected to the external device 26 having the single-ended mode transceiver 58. If there is a single-ended mode receive signal 60 on the physical port 38, the control circuit 36 keeps the single-ended mode circuit 32 active for a predetermined extended period of time. The automatic discovery circuitry 64 repeats this alternating technique in order to provide auto-discovery in this relay-style embodiment.

At this point, it should be understood that the above-described electronic system 20 is well-suited for Ethernet environments. Along these lines, the electronic system 20 is capable of carrying out Ethernet communications and delivering inline Power over Ethernet (PoE). That is, the electronic device 22 is capable of operating as power sourcing equipment (PSE) (e.g., a PoE routing device), the external device 24 is capable of operating as a remotely powered device (PD) (e.g., a network camera or a Voice over IP (VoIP) phone), and the external device 26 capable of operating as a serial console for local user access. The differential data transceiver operation is denoted by "PHY" within the figures.

In this Ethernet example, the cable 28 between the electronic device 22 and the external device 24 is preferably a high signal integrity Ethernet cable (e.g., Cat-5, Cat-5e, or better) which may extend a relatively long distance (e.g., up to 100 meters). Such a cable 28 is capable of carrying Ethernet signals (e.g., through twisted pairs within the cable 28) and concurrently conveying a voltage from the electronic device 22 across different twisted pairs of the cable 28 to deliver power from the electronic device 22 to the external device 24.

In contrast, the cable 30 between the electronic device 22 and the external device 26 is arranged to carry single-ended mode signals which share a common ground return across a relatively short distance (e.g., 15 meters or less). An Ethernet cable will suffice, but the cable 30 is preferably well-suited for supporting an RS-232 serial link between the electronic device 22 and the external device 26 which is capable of operating as a local "dumb" terminal to provide the user with a secure user interface to the electronic device 22. Further details in the context of the above-mentioned Ethernet environment will now be provided with reference to FIG. 2.

Figure 2:
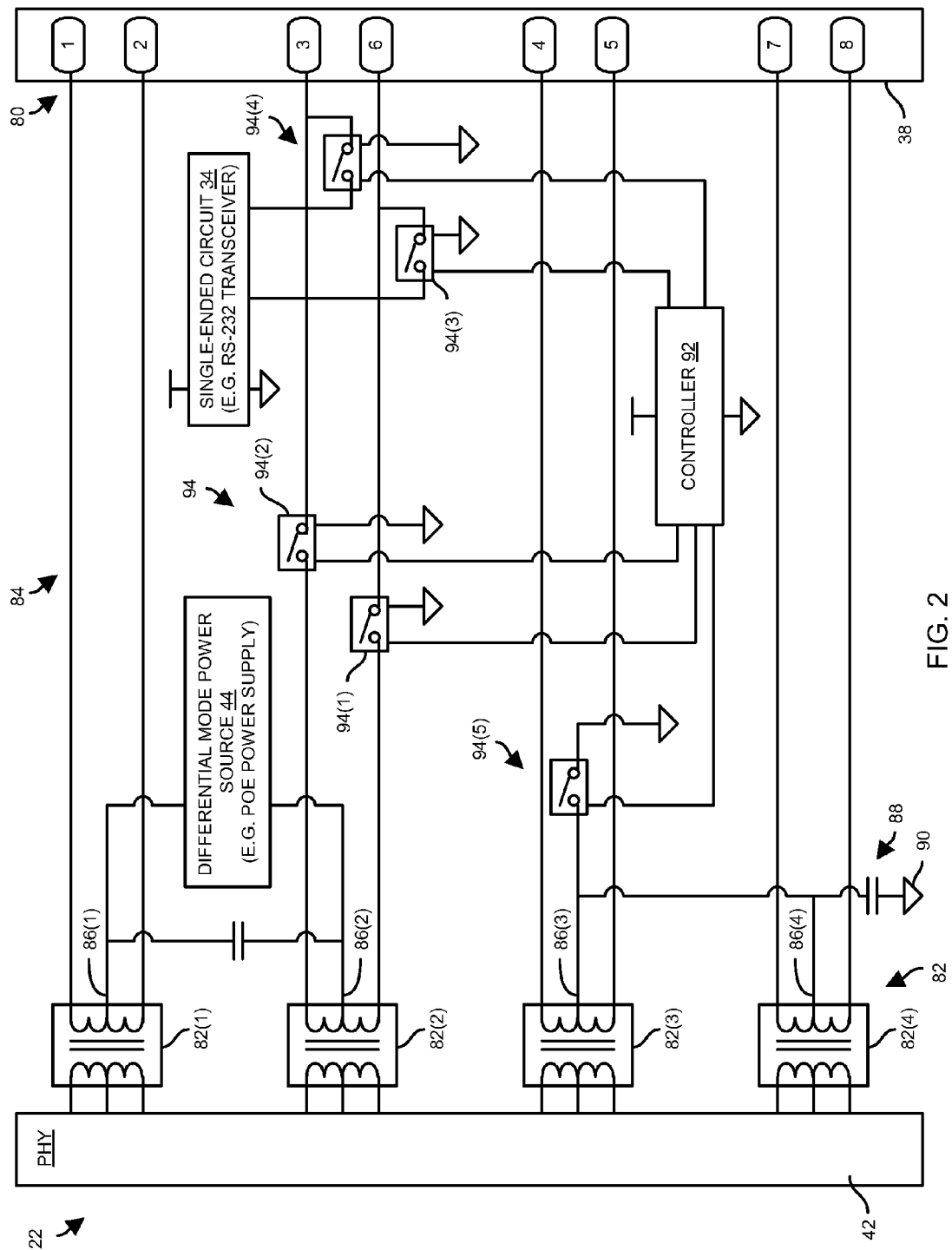
FIG. 2 is a schematic diagram of a first embodiment of an electronic device of the electronic system of FIG. 1.

FIG. 2 is a partial schematic diagram of the electronic device 22 in accordance with a relay-style embodiment. As shown in FIG. 2, the electronic device 22 is capable of providing a standard Ethernet interface with PoE capabilities through the physical port 38. Additionally, the electronic device 22 is capable of conducting singled-ended mode communications through the physical port 38.

For the purpose of providing a standard Ethernet interface, the double-duty physical port 38 includes a set of pins 80 (i.e., signal contacts or conductors) which are numbered "1" through "8". Pins "1" and "2" form a first differential pair. Pins "3" and "6" form a second differential pair. Pins "4" and "5" form another differential pair. Pins "7" and "8" form yet another differential pair. In some arrangements, the physical port 38 is an RJ45-type female connector which is configured to mate with an RJ45-type male connector. This is a typical Ethernet RJ45-type pin-out which enables employment of standard RJ45-terminated, twisted-pair cables such as Cat-3, Cat-5, and so on.

The control circuit 36 (also see FIG. 1) includes four center-tapped AC-coupling transformers 82(1), 82(2), 82(3), and 82(4) (collectively, transformers 82), and conductive pathways 84 which connect ends of the pin-side transformer windings to the pins 80. The pin-side transformer windings of the transformers 82(1), 82(2) include center taps 86(1), 86(2) which connect to the differential mode power source 44 for delivery of PoE using pins "1", "2" (e.g., 48V out) and pins "3", "6" (e.g., 48V return). The center taps 86(3), 86(4) of the transformers 82(3), 82(4) are shown floating, i.e., using a high voltage capacitor 88 which connects center taps 86(3), 86(4) to earth ground 90, but the center taps 86(3), 86(4) of the transformers 82(3), 82(4) alternatively can be connected to the differential mode power source 44 for further inline power delivery through pins "4", "5" (e.g., 48V out) and pins "7", "8" (e.g., 48V return) in a manner similar to that for the center taps 86(1), 86(2).

The control circuit 36 further includes a controller 92, and remotely-operated switches 94(1), 94(2), 94(3), 94(4), and 94(5) (collectively, switches 94) which are controlled by the controller 92. In some arrangements, the controller 92 is mechanically-operated (e.g., see the mechanically-actuated user switch 48) in FIG. 1. In other arrangements, the controller 92 is software-operated (e.g., a logical switch implemented by the user interface 62 in FIG. 1). In yet other arrangements, the controller 92 performs automatic discovery with regard to single-ended mode signaling (e.g., see the auto-sensing circuitry 64 in FIG. 1).

For Ethernet operation, the controller 92 is arranged to close the switches 94(1), 94(2) and open the switches 94(3), 94(4), 94(5) to operate the physical port 38 as an Ethernet port. During this time period, the differential mode transceiver 42 (PHY) and the differential mode power source 44 electrically connect to pins "3" and "6" through the switches 94(1), 94(2) while the switches 94(3), 94(4) electrically isolate the single-ended circuit 34 from the pins "3" and "6". Accordingly, the pins "3" and "6" are reliably AC coupled through the transformer 82(2) to the differential mode transceiver 42 to form a standard differential pair capable of carrying an Ethernet signal and providing a current path for PoE delivery. Furthermore, the differential mode power source 44 provides a pre-determined potential difference (e.g., 48V) across a first differential pair formed by the pins "1", "2" and a second differential pair formed by the pins "3", "6" for inline PoE availability through the physical port 38. Moreover, the open position of the switch 94(5) (e.g., a high voltage-tolerant relay) isolates the center taps 86(3), 86(3) of the transformers 82(3), 82(4) from earth ground.

To enable RS-232 communications through the physical port 38, the controller 92 is arranged to open the switches 94(1), 94(2) and close the switches 94(3), 94(4), 94(5). During this time period, the single-ended circuit 34 electrically connects to the pins "3" and "6" through the switches 94(3), 94(4) while the switches 94(1), 94(2) electrically isolate the differential mode transceiver 42 and the differential mode power source 44 from the pins "3" and "6". Additionally, the closed position of the switch 94(5) electrically connects the pins "4", "5" to earth ground through the conductive pathways 84 (i.e., the switch 94(5) operates as an earth ground switch to provide earth ground on demand) thus enabling the pins "4", "5" to act as a return-current reference to enable proper RS-232 signaling.

Based on the above-provided description, the controller 92 controls the switches 94 in a relay-style manner. In particular, in the context of an Ethernet implementation, the controller 92 opens and closes the appropriate switches 94 to direct the physical port 38 to operate as either an Ethernet port or a serial console port. An advantage of the particular circuit design of FIG. 2 is that the physical port 38 (e.g., presented as an RJ-45 female connector) is capable of having a pin-out which is compliant with standard RS-232 pin configurations (e.g., pin "3" for transmit, pin "6" for receive, and pins "4", "5" for ground). Further details will now be provided with reference to FIG. 3.

Figure 3:
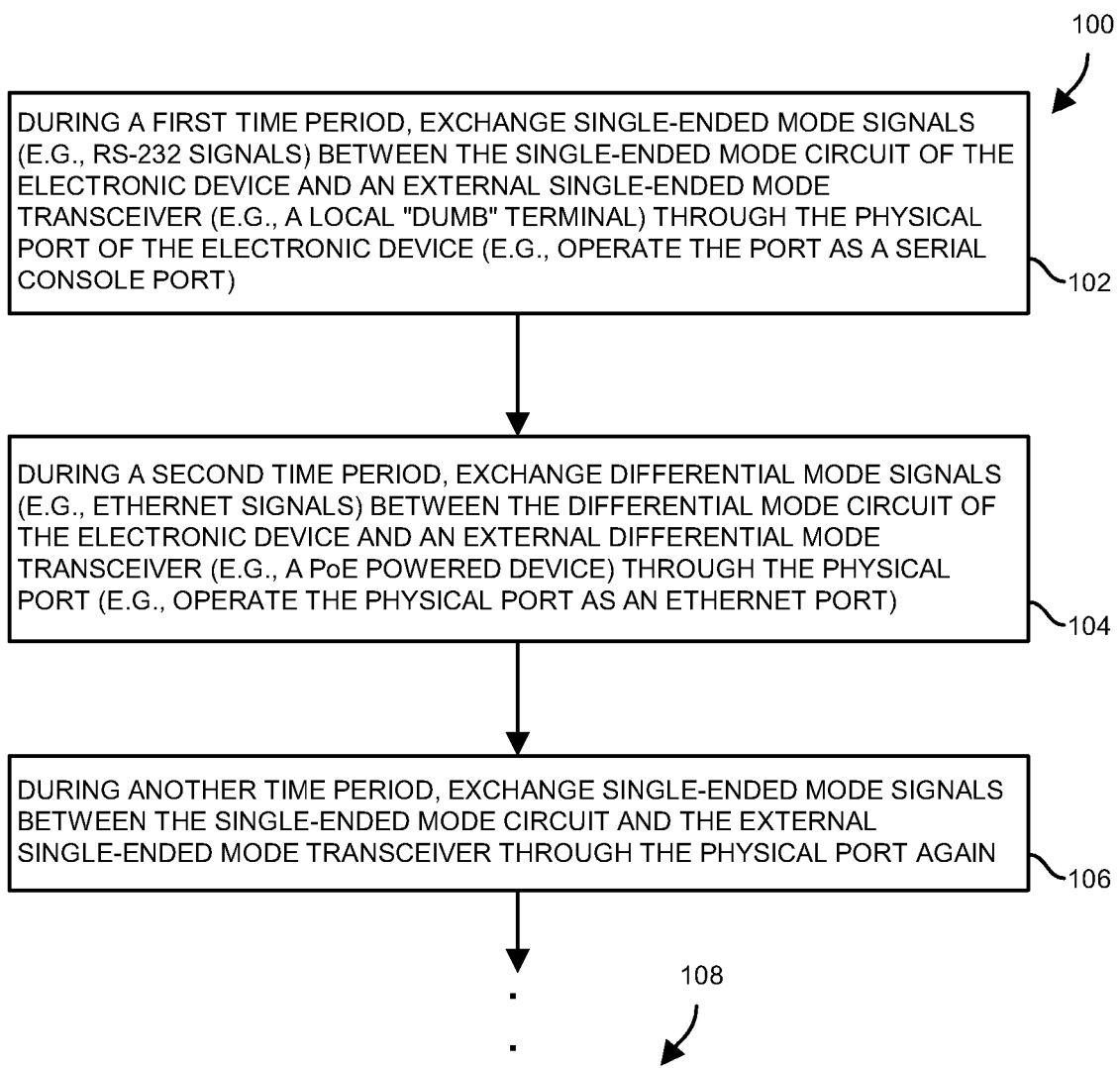
FIG. 3 is a flowchart of a procedure which is performed by the electronic device of the electronic system of FIG. 1.

FIG. 3 shows a flowchart of a procedure 100 which is performed by the electronic device 22. The procedure 100 illustrates the ability of the electronic device 22 to alternate the operation of the physical port 38 between differential mode signaling and single-ended mode signaling. In the context of an Ethernet device, the electronic device 22 is able to operate the physical port 38 as a standard Ethernet port most of the time. However, if the need arises for the user to communicate with the Ethernet device using a serial console, the user is able to direct the Ethernet device to temporarily operate the physical port 38 as an RS-232 serial console port.

In particular, when the user initially puts the electronic device 22 into operation, the user may need to configure various operating parameters of the electronic device 22. Along these lines, the user may wish to set these parameters using a secure direct local connection. Accordingly, the user connects the external device 26 to the physical port 38 of the electronic device 22 using the cable 30 (also see FIG. 1). The user then actuates a switch which directs the electronic device 22 to operate the physical port 38 as a single-ended mode port (e.g., see the mechanical switch 48 in FIG. 1). As a result and as illustrated in step 102 in FIG. 3, the electronic device 22 is now arranged to exchange single-ended mode signals 56, 60 between the single-ended mode circuit 34 and an external single-ended mode transceiver 58 of the external device 26 through the physical port 38 (also see FIG. 1). In the context of an Ethernet device, the external device 26 is a local "dumb" terminal which provides the user with local capability to carry out secure administrative functions. Such operation may occur when the user is in need of a secure connection to the Ethernet device to initially configure the Ethernet device.

When the user no longer requires use of the secure direct local connection, the user then disconnects the cable 30 from the electronic device 22 and sets actuates the switch to turn off single-ended mode capabilities of the physical port 38. At this point, the user is now able to utilize the physical port 38 as a differential mode port. In particular, the user is capable of connecting the external device 24 to the physical port 38 using the cable 28 (FIG. 1). At this point and as illustrated in step 104 in FIG. 3, the electronic device 22 is now arranged to exchange differential mode signals 50, 54 between the differential mode circuit 32 and an external differential mode transceiver 52 of the external device 24 through the physical port 38 (FIG. 1). In the context of an Ethernet device, the physical port 38 now operates as an Ethernet port within the array of ports 46 (FIG. 1) thus improving the connection density of the electronic device 22. Such operation may occur when the user does not need a secure connection to the Ethernet device but wishes to maximize Ethernet connection density to the Ethernet port array 46 (FIG. 1).

At some time later, the user may encounter the need to use the physical port 38 again as a single-ended mode port. In such a situation, the user simply disconnects the cable 28 from the physical port 38 and sets the switch so that the physical port 38 now operates as a single-ended mode port. The user then re-connects the cable 30 (FIG. 1) to the physical port 38 and, as illustrated by step 106 in FIG. 3, is thus able to exchange single-ended mode signals 56, 60 between the single-ended mode circuit 34 and an external single-ended mode transceiver 58 of the external device 26 through the physical port 38.

The above-described alternation of the physical port 38 between a differential mode port and a single-ended mode port is capable of being repeated in subsequent steps as illustrated by the arrow 108 in FIG. 3. In particular, the user is able to control the operation of the physical port 38 (e.g., acquire an RS-232 communications link on demand) by simply actuating a switching mechanism which is either mechanical in nature or software controlled (see the control circuit 36 in FIG. 1). Further details will now be provided with reference to FIGS. 4 and 5.

Figure 4:
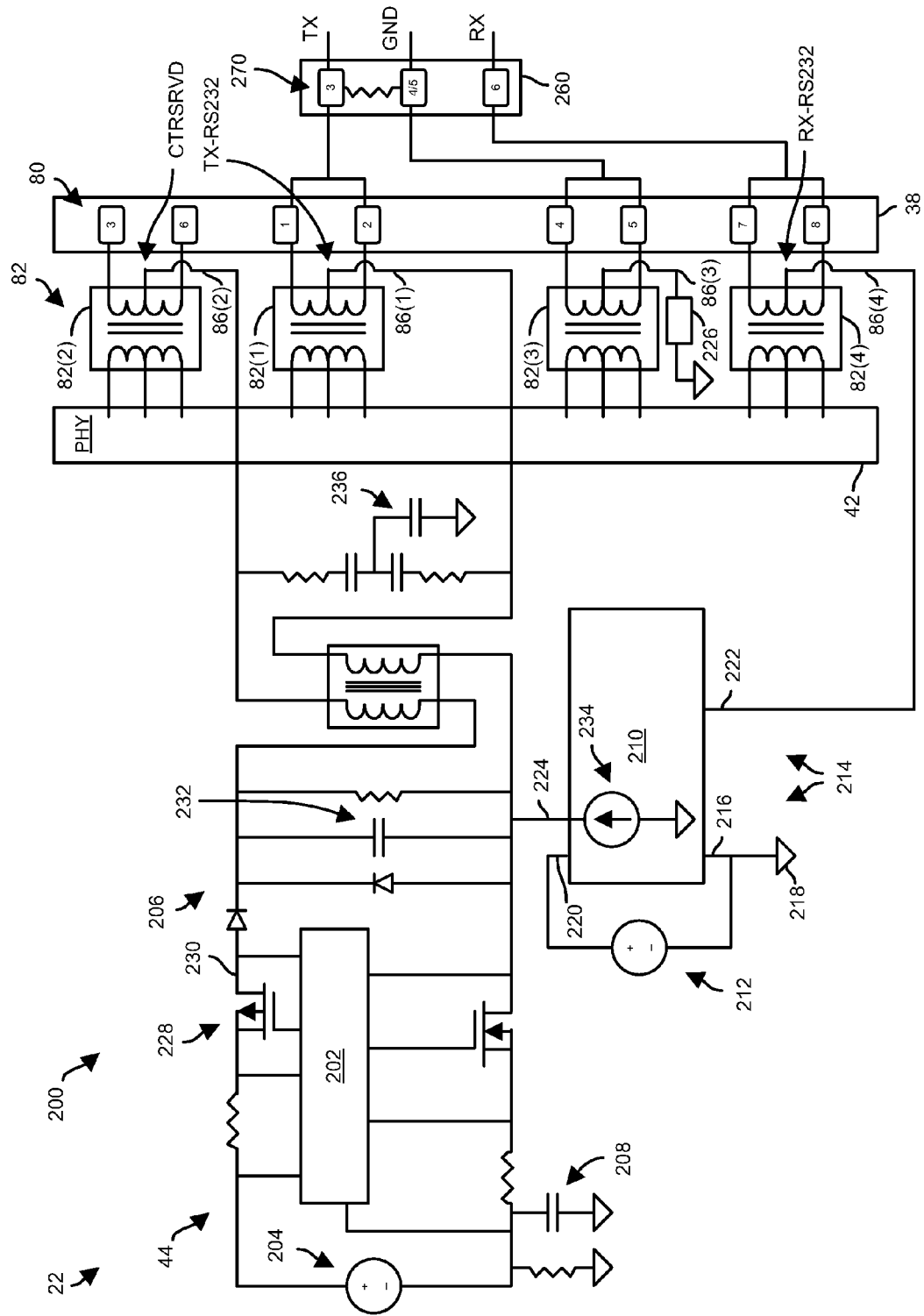
FIG. 4 is a schematic diagram of a second embodiment of the electronic device of the electronic system of FIG. 1.
Figure 5:
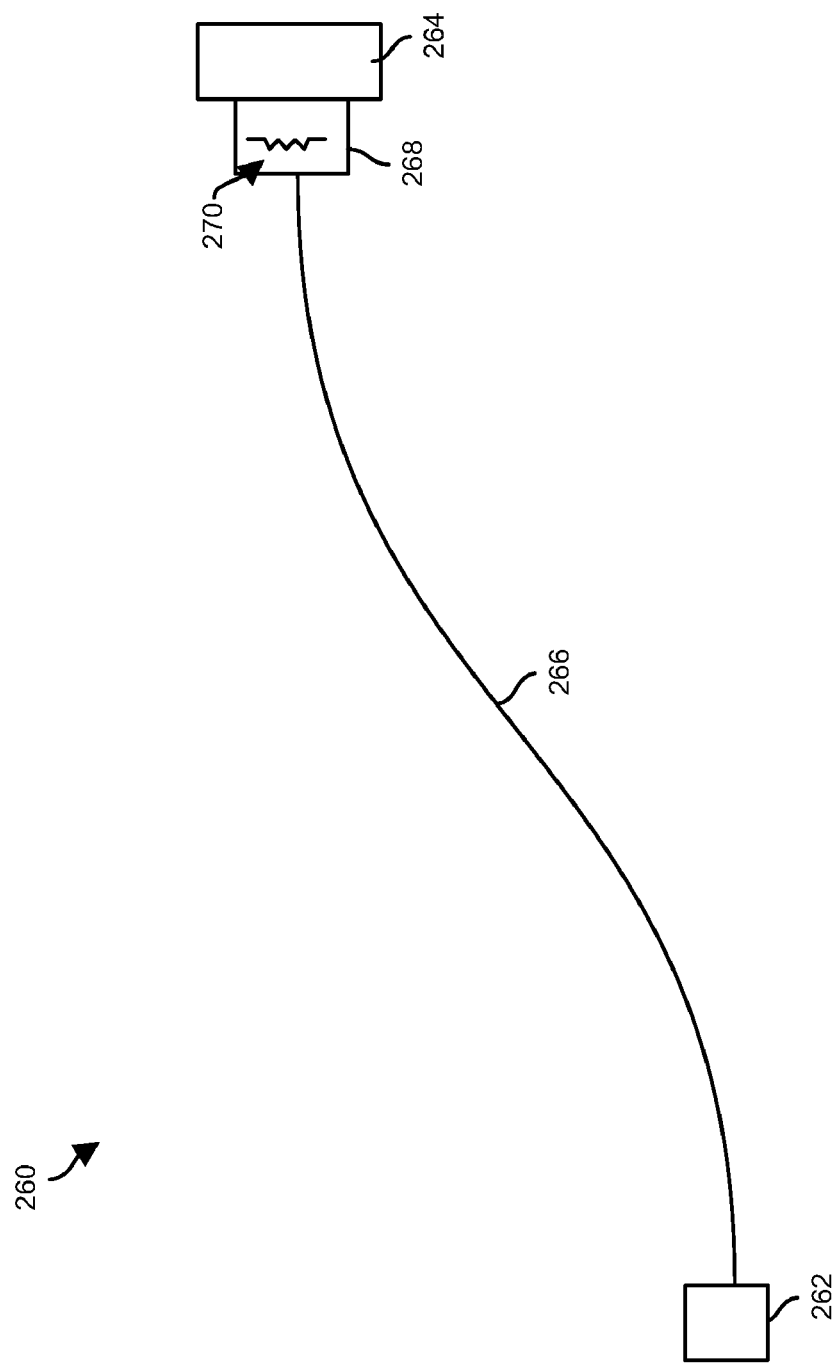
FIG. 5 is a diagram of a communications pathway used by the second embodiment of the electronic device of FIG. 4.

FIGS. 4 and 5 illustrate details of a floating-PoE embodiment for the electronic device 22 which is somewhat different than the relay-style embodiment illustrated in FIG. 2. FIG. 4 shows a schematic diagram of circuit portion 200 of the electronic device 22 in accordance with the floating-PoE embodiment. FIG. 5 shows a remapping adapter 260 which is suitable for at least part of the cable 30 (also see FIG. 1).

As shown in FIG. 4, the pins 80 of the physical port 38 are appropriately numbered in accordance with standard Ethernet protocols and connect to the differential mode transceiver 42 (PHY) through the center-tapped AC-coupling transformers 82. In particular, the pin-side transformer windings of the transformer 82(2) connect to pins "3" and "6" of the physical port 38. The pin-side transformer windings of the transformer 82(1) connect to pins "1" and "2" of the physical port 38. The pin-side transformer windings of the transformer 82(3) connect to pins "4" and "5" of the physical port 38. The pin-side transformer winding of the transformer 82(4) connects to pins "7" and "8" of the physical port 38.

As further shown in FIG. 4, the power source 44 of the differential mode circuit 32 includes a PoE controller 202, a voltage supply 204 (e.g., a 48V supply), and connecting circuitry 206. The PoE connecting circuitry 206 connects to the center tap 86(1) of the transformer 82(1), and the center tap 86(2) of the transformer 82(2). Although the PoE connecting circuitry 206 is illustrated as including discrete components, it should be understood that one or more of the components may take the form of simple electrical characteristics of conductive pathways and the support structure (e.g., circuit board material) on which the conductive pathways reside. For example, a capacitor 208 represents parasitic capacitance, $C_{parasitic}$.

Additionally, the single-ended mode circuit 34 includes an RS-232 transceiver 210 and a voltage supply 212 (e.g., a 5V supply). In some arrangements, the RS-232 transceiver 210 is an integrated circuit (IC) with a standard set of leads 214 to access the voltage supply 212 and exchange input/output (I/O). In these arrangements, the RS-232 transceiver 210 includes a ground lead 216 which connects to chassis ground 218 with proper transient protections (omitted from FIG. 4 for simplicity), and a voltage supply input 220 which connects to the voltage supply 212. The RS-232 transceiver 210 further includes a receive input 222 which connects to the center tap 86(4) of the transformer 82(4), and a transmit output 224 (e.g., the output of an internal pulse driver residing within the transceiver package) which connects to the center tap 86(1) of the transformer 82(1) through some of the PoE connecting circuitry 206.

In some arrangements, the center tap 86(3) connects directly to earth ground. However, in some optional arrangements, a switch 226 controls connection of the center tap 86(3) of the transformer 86(3) to earth ground. In these optional arrangements, the switch 226 is controlled by the RS-232 transceiver 210 (and perhaps the PoE controller 202), but the control line from the RS-232 transceiver 210 to the switch 226 is omitted from FIG. 4 for simplicity.

It should be understood that the PoE connecting circuitry 206 includes many improvements/enhancements which are not typical of standard PoE circuitry. For example, the PoE connecting circuitry 206 preferably includes a PMOS switch 228 on its top rail 230 (or alternatively an NMOS switch on the bottom rail as shown, but not both) to isolate the capacitive path to ground through capacitor 208 and capacitor 232 (i.e., PSE capacitance). Such a path would otherwise provide a "load" to the driver-transmitter 234 of the RS-232 transceiver.

As another example, a capacitor 236 of the PoE connecting circuitry 206 is purposefully set to a low capacitance setting (e.g., 68 pf) to enable RS-232 signaling at a rate of approximately 250 khz without significant signal attenuation. In contrast, the $C_{reduce}$ capacitor in standard PoE circuitry is, in general, significantly higher (e.g., 1000 pf) which would provide an undesirable path to ground.

During operation, Ethernet and RS-232 sensing remain concurrently active. That is, the PoE controller 202 senses for a PD device (see the external device 24 in FIG. 1) connected to the physical port 38. Simultaneously, the RS-232 transceiver 210 senses for an external RS-232 device (see the external device 26 in FIG. 1) connected to the physical port 38.

If a PD device connects to the physical port 38, the PoE controller 202 detects the PD device and operates the physical port 38 as an Ethernet port supporting PoE. To this end, the PoE controller 202 provides power through the center tap 86(2) leading to pin pair "3", "6" and the center tap 86(1) leading to pin pair "1", "2".

However, if an external RS-232 device connects to the physical port 38, the RS-232 transceiver 210 operates the physical port 38 as an RS-232 serial port. To this end, the RS-232 transceiver 210 receives, through the center tap 86(4) leading to pin pair "7", "8", the single-ended mode receive signal 60 (see FIG. 1). Additionally, the RS-232 transceiver 210 transmits, through the center tap 86(1) leading to pin pair "1", "2", the single-ended mode transmit signal 56 (FIG. 1). The pin pair "4", "5" connects to earth ground through the center tap 86(3) of the transformer 82(3) thus providing a ground reference for both single-ended mode signals 56, 60.

As mentioned above, RS-232 detection is capable of running in parallel with PoE/Ethernet. That is, by providing (i) the ground reference through pins "4", "5", (ii) a transmit path through pins "1", "2", and (iii) a receive path through pins "7", "8", detection of the presence of an RS-232 signal is capable of occurring simultaneously. In particular, regardless of whether there is an Ethernet device connected to the physical port 38, the RS-232 transceiver 210 is capable of constantly listening for a valid RS-232 receive signal on the center tap 86(4). If the RS-232 transceiver 210 detects the existence of an Ethernet device on the physical port 38 (e.g., see the external device 24 in FIG. 1), the RS-232 transceiver 210 does not transmit. However, if there is no Ethernet device connected to the physical port 38, the RS-232 transceiver 210 is capable of transmitting a valid RS-232 signal onto the center tap 86(1) leading to pin pair "1", "2" to declare its presence to a potential RS-232 device (e.g., see the external device 26 in FIG. 1).

As shown in FIG. 4 and in further detail in FIG. 5, the remapping adapter 260 controls mapping of the various pins/signals of the physical port 38. Such remapping provides design flexibility as to which pins are used for particular RS-232 signals when the physical port 38 operates as a serial port to connect to the external device 26. In particular, pin "3" is typically for the RS-232 transmit signal, pin "6" is typically for the RS-232 receive signal on an RJ-45 connector, and pins "4", "5" are typically for ground. The remapping provided by the remapping adapter 260 prevents a connection (short) from occurring between the transmit and receive signals on the RS-232 device.

In some arrangements, the remapping adapter 260 has the same technology connector on both ends, e.g., RJ-45 connectors at both ends. Such an RJ45-RJ45 adapter is capable of being treated by the user as a special cable whose use is dedicated to connecting an RS-232 device to the electronic device 22. In other arrangements such as that shown in FIG. 5, the remapping adapter 260 has a different technology connector at each end, e.g., an RJ45 connector at one end and a D-subminiature connector at the other. In any of these arrangements, the remapping adapter 260 is capable of including optional circuitry 268, e.g., the optional circuitry 268 is capable of controlling the amplitude of the RS-232 transmit signal 56 from the electronic device 22.

In a particular arrangement, the remapping adapter 260 includes an RJ-45 male connector 262 (e.g., an 8P8C male connector) to connect to the physical port 38, a D-subminiature electronic connector 264 (e.g., a DB-9 connector which provides a standard RS-232 pin-out), and cabling 266 which interconnects the connectors 262, 264. Such connectors 262, 264 make the remapping adapter 260 well suited for connecting a local dumb terminal to the physical port 38 via an RS-232 serial link without any additional cabling since such a terminal typically includes a 9 pin D-shell connector for I/O. The optional circuitry 268 of the remapping adapter 260 includes a single resistor 270 to adjust the amplitude of the single-ended transmit signal 56. Accordingly, the remapping adapter 260 provides control of another degree of freedom in setting the amplitude if needed. Moreover, the resistor 270 (FIG. 4) provides impedance termination to the 150-impedance created by driving the center tap 86(1) of the transformer 82(1). Further details will now be provided with reference to FIG. 6.

Figure 6:
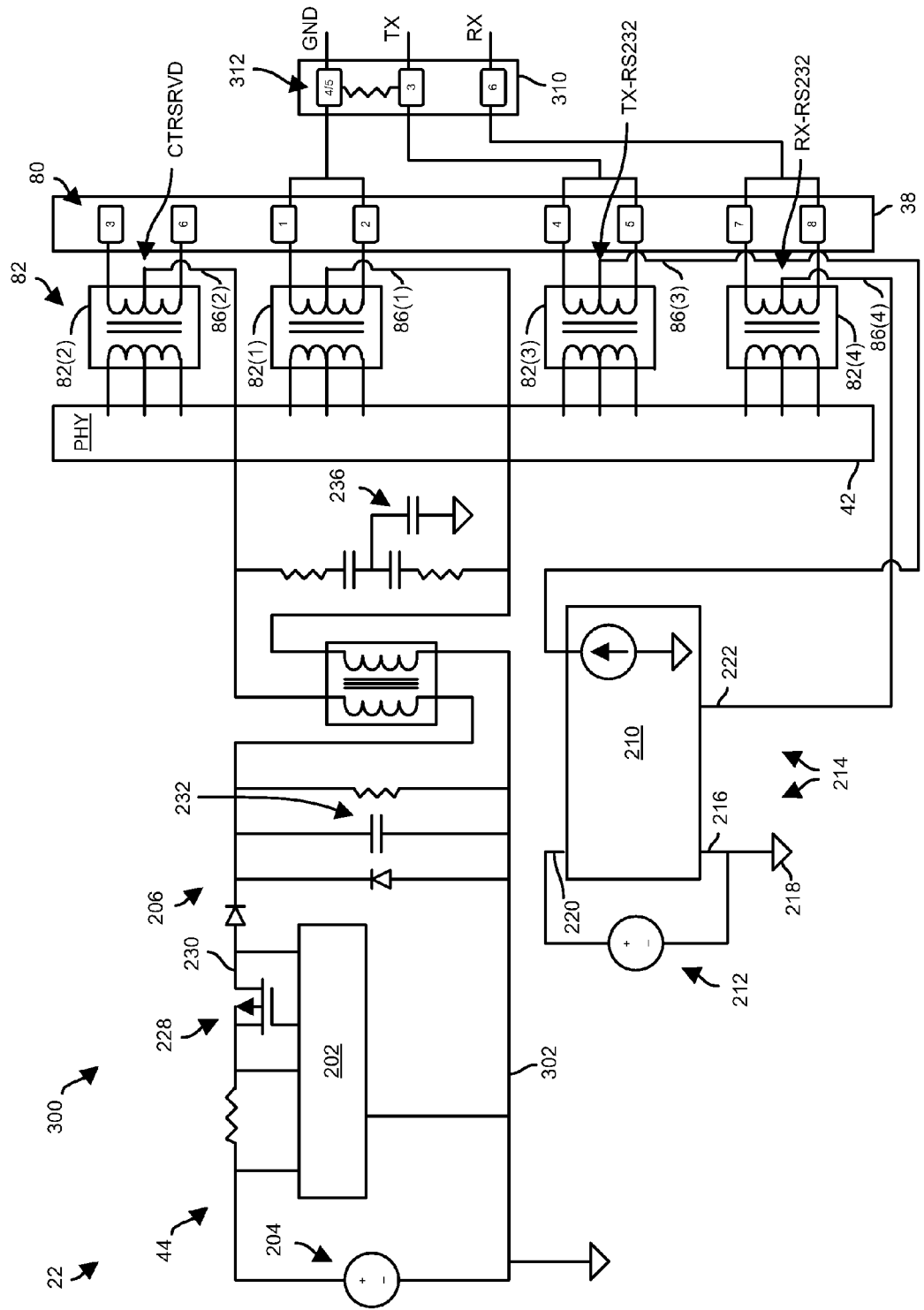
FIG. 6 is a schematic diagram of a third embodiment of the electronic device of the electronic system of FIG. 1.

FIG. 6 illustrates details of a grounded-PoE embodiment for the electronic device 22. In contrast to the floating-PoE embodiment illustrated in FIG. 4, the grounded-PoE embodiment of FIG. 6 includes a circuit portion 300 which enables at least some of the RS-232 transceiver circuitry to be co-packaged (or integrated) with the PoE controller circuitry.

As shown in FIG. 6, much of the circuit portion 300 is similar to the circuit portion 200 of the floating-PoE embodiment (FIG. 4) to provide similar dual-sensing operation. However, when the physical port 38 operates as an RS-232 serial port, the particular pins 80 carry different electrical signals. Specifically, as shown in FIG. 6, the center tap 86(1) of the transformer 82(1) connects to chassis ground thus enabling pins "1", "2" to provide a ground reference for the RS-232 transmit and receive signals. As another difference, the center tap 86(3) of the transformer 82(3) connects to the transmit output 224 of the RS-232 transceiver 210. However, in the same manner as the embodiment of FIG. 4, the center tap 86(4) of the transformer 82(4) connects to the receive input 222 of the RS-232 transceiver 210.

It should be understood that an NMOS switch on the bottom rail 302 can be substituted for the PMOS switch 228 on the top rail 230. However, with the PMOS switch 228 on the top rail 230 and with the above-described the re-assigning of pins "1", "2" to ground and pins "4", "5" to RS-232 transmit, the RS-232 transceiver 210 is now able to be conveniently lumped into the PoE controller 202 (still shown separately in FIG. 6 for simplicity). Such integration may provide a significant cost reduction as well as packaging optimizations.

During operation, Ethernet and RS-232 sensing remain concurrently active in a manner similar to that described above in connection with the floating-PoE embodiment illustrated in FIG. 4. That is, the PoE controller 202 senses for a PD device (see the external device 24 in FIG. 1) connected to the physical port 38. Simultaneously, the RS-232 transceiver 210 senses for an external RS-232 device (see the external device 26 in FIG. 1) connected to the physical port 38.

Furthermore, it should be understood that a remapping adapter 310 (FIG. 6) similar to the remapping adapter 260 (see FIGS. 4 and 5) controls mapping of the various pins/signals of the physical port 38 for the grounded-PoE embodiment of FIG. 6. Again, such remapping provides design flexibility as to which adapter pins are used for particular RS-232 signals when the physical port 38 operates as a serial port to connect to the external device 26. In particular, pin "3" is typically for the RS-232 transmit signal, pin "6" is typically for the RS-232 receive signal on an RJ-45 connector, and pins "4", "5" are typically for ground. The remapping provided by the remapping adapter 260 prevents a connection (short) from occurring between the transmit and receive signals on the RS-232 device. Furthermore, the remapping adapter 310 optionally includes a resistor 312 to adjust the amplitude of the single-ended transmit signal 56 thus providing control of another degree of freedom in setting the amplitude of the signal 56 if needed.

It should be understood that some embodiments enjoy three different types of discovery/sensing. In particular, the differential mode transceiver 42 (e.g., see the PHY in FIGS. 4 and 6) is capable of determining whether an external Ethernet device is connected to the physical port 38. Additionally, the differential mode power source 44 (e.g., see the PoE controller 202 in FIGS. 4 and 6) is capable of determining whether to provide PoE through the physical port 38. Furthermore, the controller 62 (FIG. 1) and/or the RS-232 transceiver 210 (FIGS. 4 and 6) are capable of determining whether to effectuate Ethernet signaling or RS-232 signaling through the physical port 38.

Additionally, it should be understood that, in both of the embodiments of FIG. 4 and FIG. 6, the receiver circuitry should terminate the signal paths with proper line termination to prevent signal reflection. Along these lines, twisted pair termination for Ethernet is 100 ohms for Ethernet signals, and about 150 ohms for pair-pair matching. Such 150 ohm impedance termination is appropriate since RS-232 TX and RX use the pair-pair impedance not single pair impedance of 100 ohms. Furthermore, it should be understood that RS-232 integration needs to avoid a common mode impedance range of approximately 25 kilo-ohms and a 0.1 µF capacitance when inactive since another PSE connecting to the physical port 38 might otherwise mistakenly attempt to provide power to the physical port 38 with a 48 Volt supply if the physical port 38 appears as a valid PD.

As mentioned above, an improved electronic device 22 utilizes a physical port 38 which is capable of serving double duty as either (i) a differential mode signal port or (ii) a single-ended mode signal port. For example, such a device 22 is capable of operating the physical port 38 as a standard Ethernet port during normal operating conditions. However, if there is a need to connect a local device 26 (e.g., a local "dumb" terminal) to the electronic device 22 for a period of time (e.g., for trustworthy/secure system administration), the local device 26 can connect to the same physical port 38 used earlier by an Ethernet/PoE device 24. However, when the local device 26 is connected, the physical port 38 serves as the serial console port for that period of time.

While various embodiments of the invention have been particularly shown and described, it will be understood by those skilled in the art that various changes in form and details may be made therein without departing from the spirit and scope of the invention as defined by the appended claims.

For example, in the embodiments of FIGS. 4 and 6, the center tap 86(2) leading to pins "3", "6" are not used by way of example. In other arrangements, the center tap 86(2) carries a signal CTRSVD to activate any RS-232 signal that is desirable to be received and/or transmitted along with the appropriate mapping by the adapters 260, 310.

Additionally, it should be understood that the various RJ-45 type connectors described above were mentioned for illustration purposes only. Particular embodiments of the invention are capable of using other types of connectors such as RJ-48, RJ-11, 10P10C, and the like.

Furthermore, it should be understood that the optional circuitry 268 of the remapping adapter 260 is capable of providing additional features. In some arrangements, the optional circuitry 268 takes the form of a user controllable device (e.g., either an active or passive device) that enables automatic and/or switching between the different signaling modes (e.g., RS-232 and Ethernet). In some arrangements, the optional circuitry 268 itself acts as a PD (e.g., running power over pairs "4","5" and "7","8" from another source, running auxiliary power from a USB, etc.) and allows for automatic configuration.

Additionally, it should be understood that the remapping adaptor 260 was described above as forming a portion of the cable 30 (FIG. 1) by way of example only. In other arrangements, the remapping adaptor 260 resides in other types of devices such as a connector, a dedicated box, integrated within another device (e.g., a VoIP phone, a camera, etc.). Along these lines, the physical port 38 may be attached to an end device that is carrying out dual configuration, i.e., appears as regular RS-232 at one time and modified Ethernet/RS-232 at another time. In these situations, the end device re-configures itself internally (e.g., see the optional circuitry 268 in FIG. 5) to duplicate the function of external re-mapping described above in connection with the remapping adapter 260. Such modifications and enhancements are intended to belong to various embodiments of the invention.

What is claimed is:

1. A method of communicating through a physical port of an electronic device, the method comprising:
   electrically sensing the physical port by a control circuit coupled to (i) the physical port, (ii) an Ethernet circuit arranged to exchange Ethernet signals through the physical port, and (iii) an RS-232 circuit arranged to exchange RS-232 signals through the physical port;
   operating, by the control circuit, the physical port as one of an Ethernet port and an RS-232 port based on electrically sensing the physical port;
   isolating, by switching circuitry of the control circuit, the Ethernet circuit from the physical port when the control circuit operates the physical port as the RS-232 port;
   isolating, by the switching circuitry of the control circuit, the RS-232 circuit from the physical port when operating the physical port as the Ethernet port.

2. A method as in claim 1 wherein operating the physical port as one of the Ethernet port and the RS-232 port based on electrically sensing the physical port includes:
   sending an Ethernet communications signal through the physical port to operate the physical port as the Ethernet port.

3. A method as in claim 2 wherein sending the Ethernet communications signal through the physical port includes:
   in response to a determination that the physical port is configured for Ethernet communications, transmitting the Ethernet communications signal to an external Ethernet device through the physical port.

4. A method as in claim 3, further comprising:
   from a power supply of the electronic device, supplying power to the external Ethernet device through the physical port.

5. A method as in claim 4 wherein the physical port includes differential signal contacts which are arranged to carry Ethernet communications signals between the Ethernet circuit of the electronic device and the external Ethernet device; and
   wherein supplying power to the external Ethernet device through the physical port includes providing an Ethernet power signal from the power supply to the external Ethernet device through the differential signal contacts of the physical port.

6. A method as in claim 1, further comprising:
   at a time after operating the physical port as one of the Ethernet port and the RS-232 port based on electrically sensing the physical port, operating the physical port as the other of the Ethernet port and the RS-232 port based on further electrically sensing the physical port.

7. A method as in claim 6 wherein operating the physical port as one of the Ethernet port and the RS-232 port based on electrically sensing the physical port includes sending Ethernet signals from the Ethernet circuit of the electronic device through the physical port; and
   wherein operating the physical port as the other of the Ethernet port and the RS-232 port based on further electrically sensing the physical port includes sending RS-232 signals from the RS-232 circuit of the electronic device through the physical port.

8. A method as in claim 1 wherein the switching circuitry of the control circuit includes a set of cutoff switches disposed between (i) the physical port, and (ii) the Ethernet circuit and the RS-232 circuit;
   wherein the control circuit further includes a controller coupled to the set of cutoff switches;
   wherein the control circuit is separate from the Ethernet circuit and the RS-232 circuit; and
   wherein the control circuit is arranged to:
      individually open and close particular cutoff switches of the set of cutoff switches to electrically isolate the Ethernet circuit from the physical port when the set of cutoff switches connects the RS-232 circuit to the physical port, and individually open and close the particular cutoff switches of the set of cutoff switches to electrically isolate the RS-232 circuit from the physical port when the set of cutoff switches connects the Ethernet circuit to the physical port.

9. A method as in claim 8 wherein a Power over Ethernet (PoE) power supply is arranged to deliver inline power to a remote device through the physical port when the particular cutoff switches connects the Ethernet circuit to the physical port; and wherein the particular cutoff switches are arranged to electrically isolate the PoE power supply from the physical port when the particular cutoff switches electrically connect the RS-232 circuit to the physical port.

10. A method as in claim 9 wherein an earth ground terminal is arranged to deliver an earth ground reference to the physical port which acts as a return-current reference for proper RS-232 signaling when the particular cutoff switches connects the RS-232 circuit to the physical port; and wherein the switching circuitry further includes an earth ground switch which isolates the earth ground terminal from the physical port when the particular cutoff switches electrically connect the Ethernet circuit to the physical port.

11. An electronic device, comprising:
a physical port;
an Ethernet circuit arranged to exchange Ethernet signals through the physical port;
an RS-232 circuit arranged to exchange RS-232 signals through the physical port; and
a control circuit coupled to (i) the physical port, (ii) the Ethernet circuit and (iii) the RS-232 circuit, the control circuit being arranged to:
electrically sense the physical port, and
operate the physical port as one of an Ethernet port and an RS-232 port based on electrically sensing the physical port;
the control circuit including switching circuitry arranged to (i) isolate the Ethernet circuit from the physical port when operating the physical port as the RS-232 port, and (ii) isolate the RS-232 circuit from the physical port when operating the physical port as the Ethernet port.

12. An electronic device as in claim 11 wherein the control circuit, when operating the physical port as one of the Ethernet port and the RS-232 port based on electrically sensing the physical port, is arranged to:
send an Ethernet communications signal through the physical port to operate the physical port as the Ethernet port.

13. An electronic device as in claim 12 wherein the control circuit, when sending the Ethernet communications signal through the physical port, is arranged to:
in response to a determination that the physical port is configured for Ethernet communications, transmit the Ethernet communications signal to an external Ethernet device through the physical port.

14. An electronic device as in claim 13, further comprising:
a power supply coupled to the control circuit; and wherein the control circuit is further arranged to supply power from the power supply to the external Ethernet device through the physical port.

15. An electronic device as in claim 14
wherein the physical port includes differential signal contacts which are arranged to carry Ethernet communications signals between the Ethernet circuit and the external Ethernet device; and wherein the control circuit, when supplying power to the external Ethernet device through the physical port, is arranged to provide an Ethernet power signal from the power supply to the external Ethernet device through the differential signal contacts of the physical port.

16. An electronic device as in claim 11 wherein the physical port is an 8P8C modular connector; and wherein the electronic device further comprises:
other 8P8C modular connectors which, in combination with the 8P8C modular connector, forms an array of 8P8C modular connectors.

17. An electronic device as in claim 11 wherein the switching circuitry of the control circuit includes a set of cutoff switches disposed between (i) the physical port, and (ii) the Ethernet circuit and the RS-232 circuit;

wherein the control circuit further includes a controller coupled to the set of cutoff switches;
wherein the control circuit is separate from the Ethernet circuit and the RS-232 circuit; and
wherein the control circuit is arranged to:
individually open and close particular cutoff switches of the set of cutoff switches to electrically isolate the Ethernet circuit from the physical port when the set of cutoff switches connects the RS-232 circuit to the physical port, and
individually open and close the particular cutoff switches of the set of cutoff switches to electrically isolate the RS-232 circuit from the physical port when the set of cutoff switches connects the Ethernet circuit to the physical port.

18. An electronic device as in claim 17, further comprising:
a Power over Ethernet (PoE) power supply which is arranged to deliver inline power to a remote device through the physical port when the particular cutoff switches connects the Ethernet circuit to the physical port; and
wherein the particular cutoff switches are arranged to electrically isolate the PoE power supply from the physical port when the particular cutoff switches electrically connect the RS-232 circuit to the physical port.

19. An electronic device as in claim 18 wherein an earth ground terminal is arranged to deliver an earth ground reference to the physical port which acts as a return-current reference for proper RS-232 signaling when the particular cutoff switches connects the RS-232 circuit to the physical port; and wherein the switching circuitry further includes an earth ground switch which isolates the earth ground terminal from the physical port when the particular cutoff switches electrically connect the Ethernet circuit to the physical port.

20. An electronic device, comprising:
a physical port;
a control circuit coupled to the physical port, the control circuit being arranged to:
electrically sense the physical port, and
operate the physical port as one of an Ethernet port and an RS-232 port based on electrically sensing the physical port;
an Ethernet circuit coupled to the control circuit; and
an RS-232 circuit coupled to the control circuit;
wherein the control circuit is further arranged to, at a time after operating the physical port as one of the Ethernet port and the RS-232 port based on electrically sensing the physical port, operate the physical port as the other of the Ethernet port and the RS-232 port based on further electrically sensing the physical port;

wherein the control circuit, when operating the physical port as one of the Ethernet port and the RS-232 port based on electrically sensing the physical port, is arranged to isolate the RS-232 circuit from the physical port while sending Ethernet signals from the Ethernet circuit through the physical port; and wherein the control circuit, when operating the physical port as the other of the Ethernet port and the RS-232 port based on further electrically sensing the physical port, is arranged to isolate the Ethernet circuit from the physical port while sending RS-232 signals from the RS-232 circuit through the physical port.

* * * * *